(12) United States Patent
Pasty

(10) Patent No.: US 7,026,828 B2
(45) Date of Patent: Apr. 11, 2006

(54) RECORDING MODULE WITH A UNIVERSAL INPUT FOR MEASUREMENT OF PHYSICAL PARAMETERS

(75) Inventor: Alain Pasty, Fontenay les Briis (FR)

(73) Assignee: Ermme, Vert le Petit (FR)

( * ) Notice: Subject to any disclaimer, the term of this patent is extended or adjusted under 35 U.S.C. 154(b) by 0 days.

(21) Appl. No.: 10/504,819

(22) PCT Filed: Feb. 18, 2003

(86) PCT No.: PCT/FR03/00516

§ 371 (c)(1),
(2), (4) Date: Aug. 17, 2004

(87) PCT Pub. No.: WO03/071237

PCT Pub. Date: Aug. 28, 2003

(65) Prior Publication Data

US 2005/0083069 A1    Apr. 21, 2005

(30) Foreign Application Priority Data

Feb. 18, 2002 (FR) .................................. 02 02043

(51) Int. Cl.
*G01R 27/02* (2006.01)
(52) U.S. Cl. ...................... 324/607; 324/605
(58) Field of Classification Search ............... 324/607, 324/605
See application file for complete search history.

(56) References Cited

U.S. PATENT DOCUMENTS

| | | | | |
|---|---|---|---|---|
| 3,859,654 A | * | 1/1975 | Harrison et al. | 341/141 |
| 3,895,376 A | * | 7/1975 | Uchida | 341/128 |
| 4,016,557 A | * | 4/1977 | Zitelli et al. | 341/139 |
| 5,152,482 A | * | 10/1992 | Perkins et al. | 244/173.1 |
| 5,469,051 A | * | 11/1995 | Yarmchuk | 324/158.1 |
| 5,877,718 A | * | 3/1999 | Andoh et al. | 341/155 |
| 5,949,247 A | * | 9/1999 | Lima et al. | 324/772 |
| 6,369,584 B1 | * | 4/2002 | Morimoto et al. | 324/607 |
| 6,774,643 B1 | * | 8/2004 | Magill | 324/663 |
| 2005/0200510 A1 | * | 9/2005 | Yoshida et al. | 341/155 |

FOREIGN PATENT DOCUMENTS

| | | |
|---|---|---|
| DE | 39 00 782 | 7/1989 |
| GB | 2 135 842 | 9/1984 |

* cited by examiner

*Primary Examiner*—Anjan Deb
(74) *Attorney, Agent, or Firm*—Young & Thompson

(57) ABSTRACT

A recording card for the measurement of physical parameters includes at least one analogue-digital converter and at least one input connector for connection to a sensor. The recording card further includes a voltage source and a reference resistance arranged in series between the voltage source and a pin on the input connector. The analogue-digital converter has a reference input supplied with a voltage taken from the pins of the reference resistance and a conversion input supplied with a voltage taken from the pins of the input connector.

12 Claims, 3 Drawing Sheets

RECORDING MODULE WITH A UNIVERSAL INPUT FOR MEASUREMENT OF PHYSICAL PARAMETERS

CROSS REFERENCE TO RELATED APPLICATION

The present application is the national stage under 35 U.S.C. 371 of PCT/FR03/00516, filed Feb. 18, 2003.

BACKGROUND OF THE INVENTION

The present invention relates to an acquisition module for the measurement of physical parameters, and relates in particular, but not limitatively, to an autonomous acquisition card. Such an acquisition card comprises a connector to be connected to a sensor of physical parameters such as for example temperature.

The acquisition card receives analogue data from the sensor, converts it into digital data for a microcomputer or any other calculation and processing means.

DESCRIPTION OF THE RELATED ART

Generally, an acquisition card comprises several acquisition channels. Each acquisition channel comprises means for protection against overvoltage and means for filtering and amplification of the analogue signal. The acquisition channels inject the analogue signals into a single multiplexer intended to connect a single acquisition channel to an analogue-to-digital converter at each instant.

The acquisition cards of the prior art comprise inputs which are predetermined for a given physical parameter. For example an acquisition card designed to receive an input voltage cannot measure a current or a resistor without using specific adapters. These adapters are restricting because they require a specific wiring and make it difficult to produce a measurement.

Analogue-to-digital converters of Delta-Sigma type produced by Analogue Devices® are known for example. The technical specifications of these converters mention a certain number of methods of implementation, in which for example two methods for measuring the temperature are identified, using a platinum probe PT100 (temperature sensor) and using a thermocouple, and a method for measuring the pressure using a pressure transmitter. It is clearly noted that each method of implementation requires a particular wiring and configuration.

SUMMARY OF THE INVENTION

The subject of the present invention is to remedy the above-mentioned drawbacks by proposing an acquisition module capable of measuring a large number of physical parameters, i.e. making the inputs of such an acquisition card quasi-universal, and principally for the parameters Voltage, Current and Resistance.

Another objective of the invention is limiting the use of an adaptor upstream of the inputs of an acquisition card, in particular the use of converters of external measurements.

The above-mentioned objectives are obtained with an acquisition module according to the invention, for the measurement of physical parameters, this module comprising at least one analogue-to-digital converter and at least one input connector capable of receiving a sensor.

According to the invention, this acquisition module also comprises a power supply and a reference impedance arranged in series between the power supply and a terminal of the input connector. The analogue-to-digital converter comprises a reference input supplied with a voltage taken at the terminals of the reference impedance and a conversion input supplied with a voltage taken via the input connector at the sensor terminals. Moreover, this acquisition module comprises means for delivering an image of the physical parameter measured by the sensor.

The present invention is characterized by the fact that advantageously it uses an analogue-to-digital converter which requires an external reference. This converter can be of the type with differential inputs and by way of non-limitative example converters of the Delta-Sigma type, converters with successive approximations, flash converters or also ramp converters can be mentioned.

The analogue-to-digital converter can also be of the common mode input type; and it can comprises a first differential amplifier arranged between the reference input and the reference impedance and a second differential amplifier arranged between the conversion input and the sensor. In this case there is reason to define a common earth to these two amplifiers.

For the most common measurements, generally, the power supply is a voltage and the impedance is a resistor. Once the characteristics of the voltage source and the reference resistor are known, it is then possible to deduce the value of the physical parameter measured from the digital value generated by the analogue-to-digital converter. The same result is achieved by using a current source.

Advantageously, the acquisition module can comprise a memory for storing all of the parameters and variables.

In contrast to the cards of the prior art, the acquisition card according to the invention can measure a voltage or a resistance without modifying the architecture of the card and without interposing any adapter.

Advantageously, each connecter comprises four pins so that many types of assembly can be envisaged such as measurement on four wires using the four pins or also measurement of voltage or current using only two pins.

With the process according to the invention independence from the power supply and from the current passing through over the measurement branch is achieved.

As regards the measurement of current, the acquisition module also comprises a measurement resistor arranged at the terminals of the input connector. In this case, the measurement resistor has passing through it the current to be measured and the current originating from the voltage source. Measurement of the current simply requires the addition of a measurement resistor. This additional resistor can be a resistor previously arranged on the card, its recognition being carried out by switching of the input connector on this resistor in an automatic way using an analogue switch for example.

According to an advantageous characteristic of the invention, the acquisition module consists of a card which can be plugged into a processing unit such as a microcomputer. Consequently it can be equipped with a PCI (Peripheral Component Interconnect) connector.

The power supply can be provided by the user or can come from an independent source. This independent source can for example be the microcomputer to which the acquisition module is connected via a USB (Universal Serial Bus) link for example.

Otherwise the power supply can be internal to the analogue-to-digital converter. It can also be programmable.

According to an embodiment of the invention, the acquisition module can include processing means capable of processing the digital data originating from the analogue-to-digital converter in order to determine a value of the physical parameter measured. This characteristic would be advantageous for an autonomous functioning in the case of an acquisition module comprising integrated intelligence such as for example a microcontroller associated with dedicated applications.

Moreover, means for protection against overvoltage can be arranged between the analogue-to-digital converter on the one hand and the reference resistor and the connector on the other.

According to an embodiment of the invention, the acquisition module can comprise a plurality of acquisition channels.

BRIEF DESCRIPTION OF THE DRAWINGS

Other characteristics and advantages of the invention will also become apparent in the description below. In the attached drawings given by way of non-limitative example.

DESCRIPTION OF THE PREFERRED EMBODIMENTS

Figure 1:
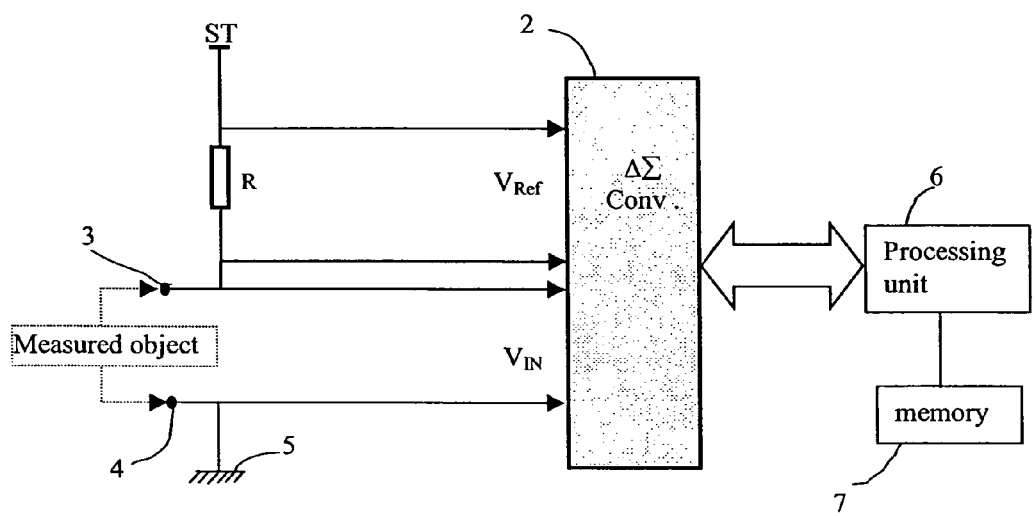
FIG. 1 is a block diagram illustrating an analogue input channel of a card for acquisition of physical parameters according to the invention.

This acquisition card according to the invention comprises at least one analogue input channel represented by a connector equipped with two terminals 3 and 4. The object of the measurement is intended to be connected between the terminals 3 and 4. The acquisition card comprises an analogue-to-digital converter 2 of Delta-Sigma type for which the conversion input is fed with the voltage at the terminals of the connector (3, 4).

The reference input of the analogue-to-digital converter is supplied with a voltage $V_{Ref}$ taken at the terminals of a resistor R. The resistor R is arranged between a voltage source VS and the terminal 3 of the input connector, the terminal 4 of the input connector being connected directly to earth 5. The digital value at the output of the analogue-to-digital converter 2 is directed to a processing unit 6 which can be a microcontroller arranged on the acquisition card or else the microprocessor of a microcomputer into which the acquisition card is integrated. Means for data storage 7, arranged on the acquisition card, store in the memory the characteristic values of the voltage source VS and of the resistor R in order to allow the processing unit to determine the value of the physical parameter measured. By way of example, when a temperature sensor is arranged between terminals 3 and 4, the processing unit allows determination of the temperature of this sensor using the digital value of the voltage measured at terminals 3 and 4.

Figure 2:
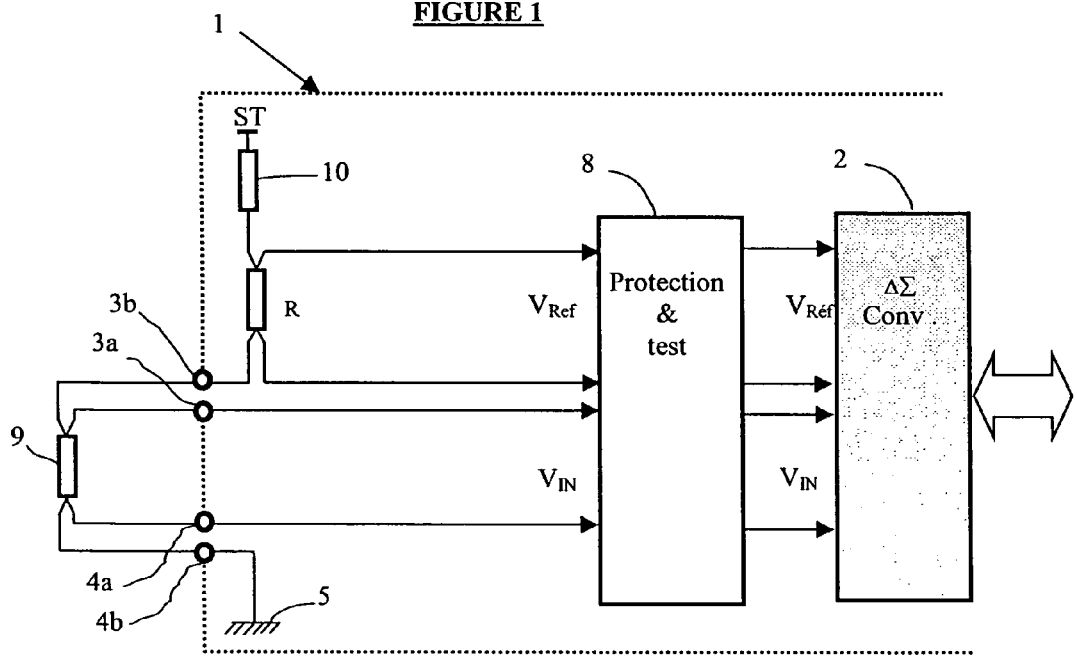
FIG. 2 is a simplified electronic diagram of an acquisition card according to the invention for the measurement of a platinum probe according to the invention.

In FIG. 2 an embodiment of the acquisition card according to the invention for measuring a platinum probe of PT100 or PT1000 type or a strain gage, for example, is represented. Compared to the diagram of FIG. 1, certain additional elements are incorporated. The protection and testing means 8 which allow the inputs of the converter 2 to be protected against any overvoltage should be noted. A current limiting resister 10 is arranged between the voltage source VS and the reference resistor R. The input connector comprises four pins (or terminals) 3a, 3b, 4a, 4b allowing measurements to be produced with maximum precision according to the method with four wires. The fact of having these four pins permits many types of assembly.

The platinum probe 9 to be measured is directly connected to the input connector via four wires.

Figure 3:
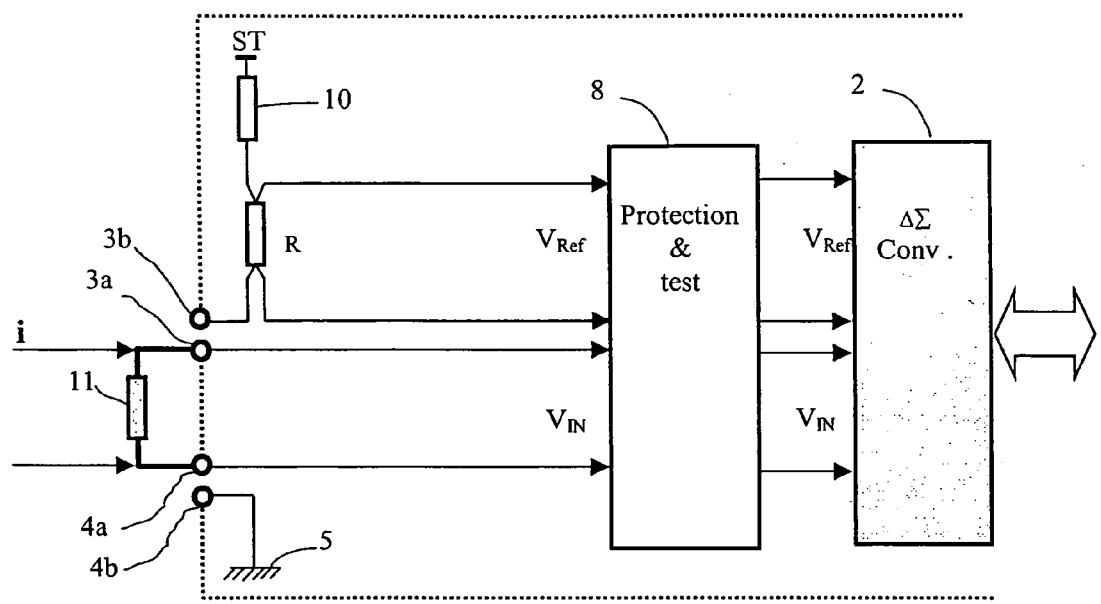
FIG. 3 is a simplified electronic diagram illustrating the basic principle for the measurement of current according to the invention.

FIG. 3 illustrates another embodiment of the acquisition card 1 according to the invention for measuring current.

For this, a new resistor 11 is added whose value is identical to the value of the reference resistor R. This resistor 11 is arranged at the terminals of the input connector. The current to be measured is then applied to the terminals of this resistor 11. The analogue voltage which is then converted is the voltage at the terminals of this resistor 11.

The assembly of FIG. 3 can also serve for the measurement of any type of thermocouple. The temperature compensation of the cold junction can then be produced with one of the available channels of the card, a software program compensating for and linearizing the measurements in the processing unit.

Figure 4:
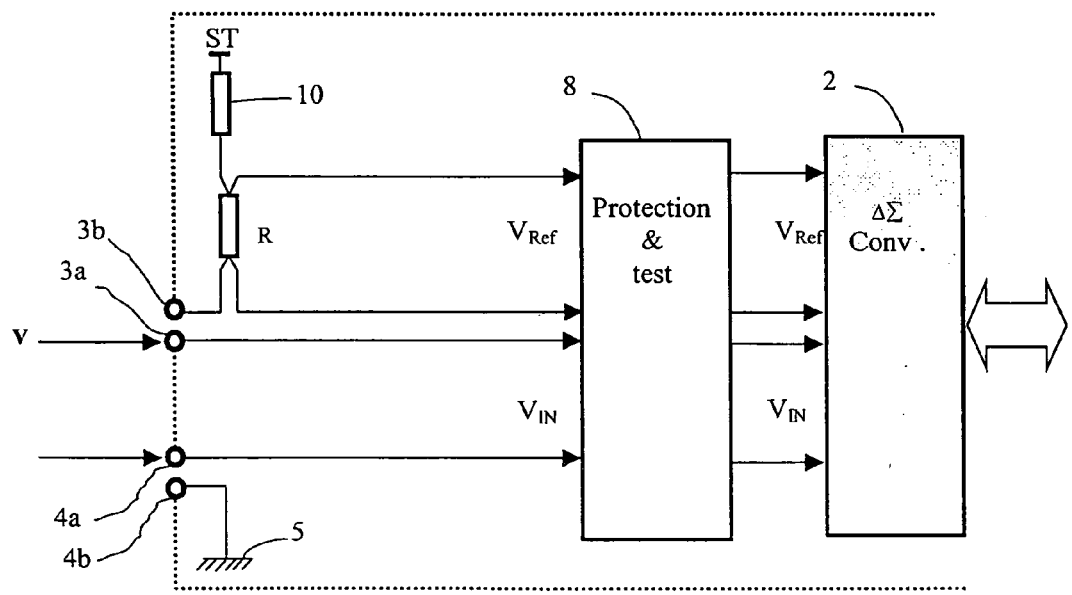
FIG. 4 is a simplified electronic diagram illustrating the basic principle for the measurement of voltage according to the invention.

In FIG. 4 another embodiment of the acquisition card according to the invention for measuring voltage is represented. The voltage to be measured is applied directly to the terminals of the input connector.

For the measurement of current and voltage (FIGS. 3 and 4), the supply voltage can be a reference voltage source internal to the analogue-to-digital converter, this is a stabilized voltage which allows optimization of the measurements.

The invention is in particular characterized by the fact that the successive measurements are obtained in a precise, reliable and consistent way. For this, any drifts due to the power supply or to the measuring current are guarded against. In fact, as regards the measurement of the voltage or the platinum probe for example (resistive sensor), the current which passes through the measurement branch ($I_{mes}$) is the same as the one ($I_{ref}$) which passes through the reference resistor.

Moreover:

$V_{ref}=R*I_{ref}$——voltage present at the terminals of the reference resistor and measured by the reference input of the analogue-to-digital converter. Similarly at the terminals of the resistor to be measured (the sensor):

$$V_{mes}=R_{sensor}*I_{mes}$$

It being understood that:

$$I_{mes}=I_{ref}$$

Consequently, as the converter produces at the output:

$$S=K\,V_{mes}/V_{ref}==>S=K*R_{sensor}/R$$

$$\text{or } S=K1\,R_{sensor}$$

The measurement is therefore not dependent on the supply voltage or on the measurement current (K and K1 are two coefficients).

As is seen from all the embodiments represented, the acquisition card according to the invention allows measurement of numerous physical parameters without however greatly modifying the architecture. Only for measurement of current, is a measurement resistor arranged at the terminals of the input connector.

Figure 5:
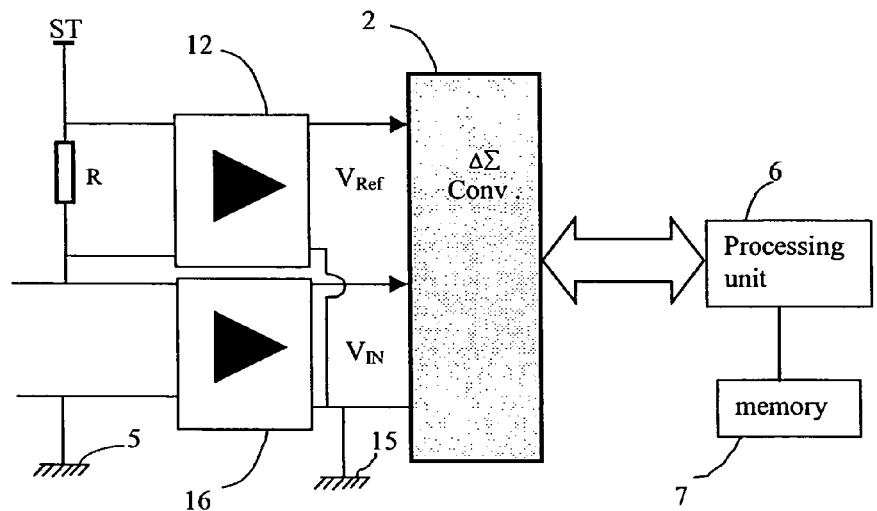
FIG. 5 reproduces the simplified electronic diagram of FIG. 1 incorporating into it an operational amplifier.

FIG. 5 illustrates an embodiment in which the analogue-to-digital converter is no longer of the differential input type. In this case two amplifiers 12 and 16 are arranged upstream of the reference and conversion inputs. A common earth 15 is then envisaged.

Figure 6:
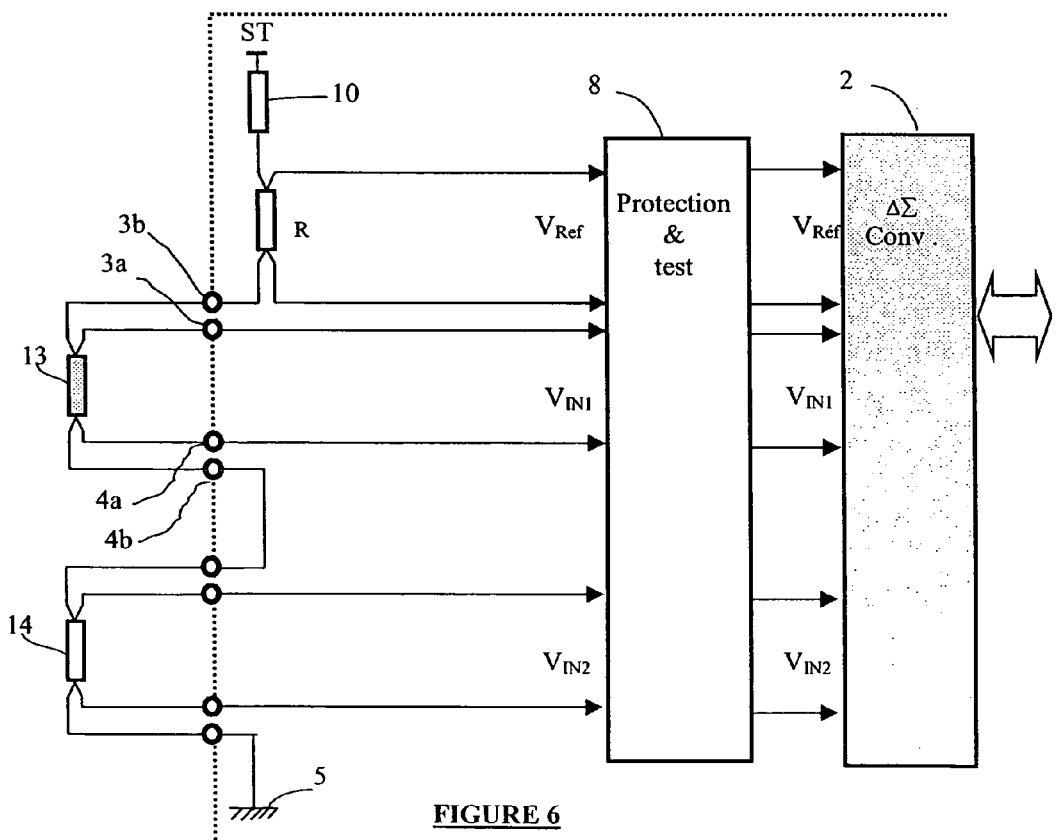
FIG. 6 is an electronic diagram illustrating an acquisition module according to the invention equipped with several acquisition channels on the measurement branch.

FIG. 6 illustrates a variant of the invention comprising several acquisition channels, only two of the channels being represented. Two sensors 13 and 14 respectively arranged on the two input connectors are identified. A reference voltage $V_{ref}$ is retained and the analogue-to-digital converter accepts two measurement voltages $V_{in1}$ and $V_{in2}$.

Of course the invention is not limited to the examples which have just been described and many variations can be made to these examples without exceeding the scope of the invention.

What is claimed is:

1. Acquisition module for the measurement of physical parameters, comprising:
   at least one analogue-to-digital converter,
   at least one input connector capable of receiving a sensor,
   a supply source and a reference impedance arranged in series between said supply source and a terminal of the input connector,
   said analogue-to-digital converter comprising differential inputs, a reference input supplied with a voltage taken at the terminals of said reference impedance and a conversion input supplied with a voltage taken via the input connector at the sensor terminals, and
   means for delivering an image of the physical parameter measured by the sensor.

2. Acquisition module according to claim 1, characterized in that it comprises a memory for storing parameters and variables.

3. Acquisition module according to claim 1, characterized in that it consists of a card which can be plugged into a processing unit such as a microcomputer.

4. Acquisition module according to claim 3, characterized in that the supply source originates from the processing unit.

5. Acquisition module according to claim 1, characterized in that the supply source is internal to the analogue-to-digital converter.

6. Acquisition module according to claim 1, characterized in that the supply source is programmable.

7. Acquisition module according to claim 1, characterized in that it comprises processing means capable of processing the digital data originating from the analogue-to-digital converter in order to determine a value of the physical parameter measured.

8. Acquisition module according to claim 1, characterized in that it comprises means for protection against overvoltage arranged between the analogue-to-digital converter on the one hand and the reference resistor and the connector on the other.

9. Acquisition module according to claim 1, characterized in that the analogue-to-digital converter consists of a Delta-Sigma converter.

10. Acquisition module according to claim 1, characterized in that the analogue-to-digital converter is of the common mode input type together with a first differential amplifier arranged between the reference input and the reference impedance and a second differential amplifier arranged between the conversion input and the sensor.

11. Acquisition module according to claim 1, characterized in that it comprises a plurality of acquisition channels.

12. Acquisition module for the measurement of physical parameters, comprising:
   at least one analogue-to-digital converter;
   at least one input connector capable of receiving a sensor;
   a supply source and a reference impedance arranged in series between said supply source and a terminal of the input connector; and
   image delivery part to deliver an image of the physical parameter measured by the sensor,
   a reference resistor,
   said analogue-to-digital converter comprising differential inputs,
   a reference input supplied with a reference voltage taken at the terminals of said reference impedance, and
   a conversion input supplied with a voltage taken via the input connector at the sensor terminals, wherein,
   a first current which passes through measurement branch ("$I_{mes}$") is the same as a second current ("$I_{ref}$") which passes through the reference resistor ("$I_{mes}=I_{ref}$"),
   a voltage present at the terminals of the reference resistor is measured by the reference input of the analogue-to-digital converter and is equal to a resistance of the resistor times the second current ("$V_{ref}=R*I_{ref}$"),
   a voltage at the terminals of the sensor is a resistance of the sensor times the first current ("$V_{mes}=R_{sensor}*I_{mes}$"),
   said converter produces an output measurement non-dependent on the supply voltage and non-dependent on measurement current.

* * * * *